Aug. 6, 1963  T. C. WARNER, JR., ETAL  3,100,292
VIBRATION PICKUP
Filed Jan. 8, 1960
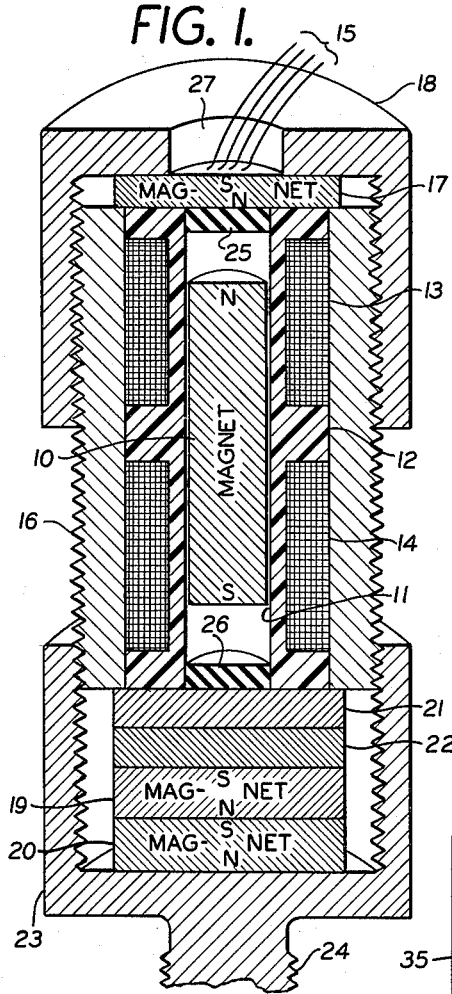
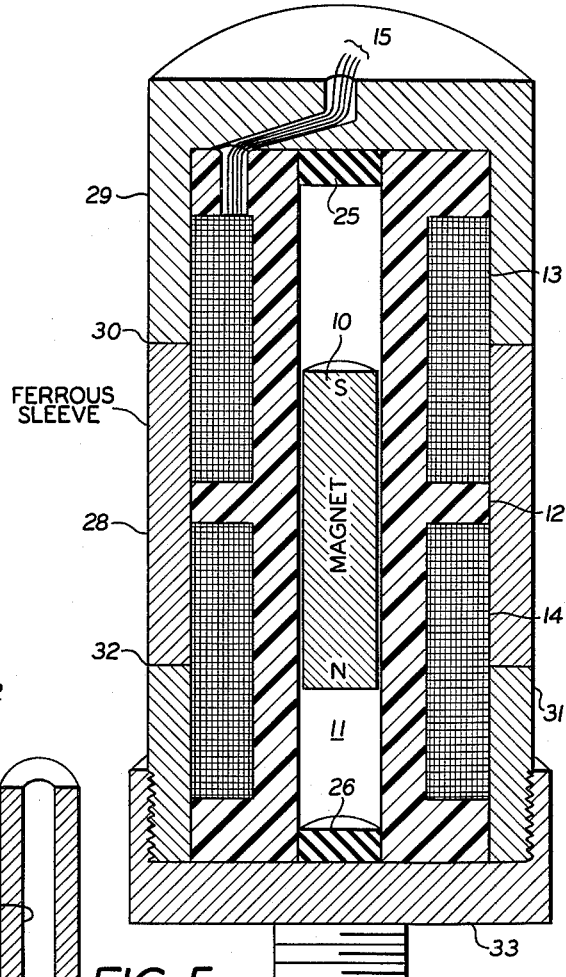
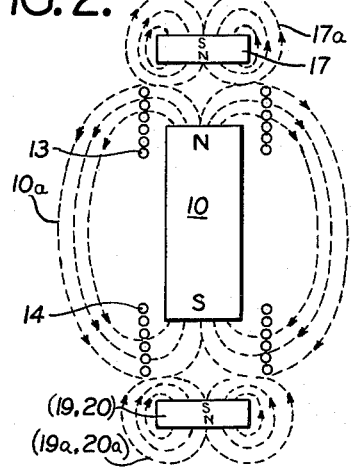
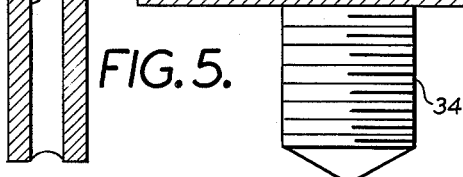
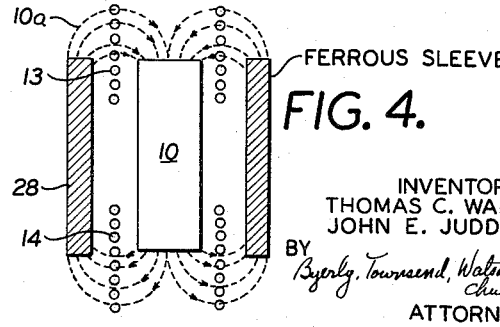
INVENTORS
THOMAS C. WARNER, JR.
JOHN E. JUDD
BY Byerly, Townsend, Watson & Churchill
ATTORNEYS.

United States Patent Office 3,100,292
Patented Aug. 6, 1963

3,100,292
VIBRATION PICKUP
Thomas C. Warner, Jr., West Haven, and John E. Judd, Hamden, Conn., assignors to Textron Electronics, Inc., Providence, R.I., a corporation of Delaware
Filed Jan. 8, 1960, Ser. No. 1,370
10 Claims. (Cl. 340—17)

The present invention relates to a vibration pickup, and more particularly to pickups of the seismic type.

It is well known that if a weight is suspended by a suitable spring from a frame, the weight will remain substantially motionless although the frame be reciprocated along a line coincident with the spring axis so long as the frequency of reciprocation exceeds the natural frequency of oscillation of the weighted spring by a predetermined amount. This principle is utilized in the seismograph as well as in vibrographs and other vibration sensing and measuring equipment.

In view of the present level of development of vibration testing equipment, that is, equipment designed to subject specimens to controlled vibration for testing behavior under artificially created environmental conditions, it is of extreme practical importance to have a light weight, sensitive, small and rugged device for detecting and sensing the vibrations imparted to the specimen. Because the motion to be investigated is not always in the same plane, the pickup should be omni-directional, functioning with equal sensitivity whether upright, horizontal, or even inverted.

As a result of the present invention it has been found possible to compress into a container smaller than the tip of an average man's thumb an electro-mechanical vibration pickup weighing less than 2 ounces and having a sensitivity of the order of 100 mv./in./sec. As will appear from the ensuing description, the pickup is omni-directional and virtually frictionless in operation.

Specifically, it has been discovered possible to dispense completely with any mechanical support of the weight and to eliminate all springs and bearings. The present invention, instead, makes use of the phenomenon that a suitably shaped magnetic field will buoy or float a magnetic member immersed therein.

In accordance with the present invention there is provided a vibration pickup comprising a pair of elements movable relative to each other, at least one of said elements comprising a magnet and the other of said elements including magnetic material, said elements being disposed in a magnetic circuit so as to be spring-coupled magnetically in spaced relationship, means for imparting vibration to one of said pair of elements, and means for providing a signal responsive to relative movement between said elements.

Throughout the specification reference to the fact that elements are spring-coupled magnetically should be understood to mean that one of the elements is suspended in space magnetically by forces of attraction or repulsion, "floating" in a magnetic field linking or bridging the gap between the elements. It will be understood that the behaviour of an object "floating" in a magnetic field is substantially the same as that of an object at the end of a spring, and that the various physical laws applicable to the latter can be readily adapted or applied to the former. The magnetic suspension will have a natural period of oscillation, the equivalent of a spring constant, and so forth.

It is believed that the invention will be better understood after reading the following detailed description of several exemplary embodiments thereof with reference to the appended drawing in which:

FIG. 1 is a vertical sectional view through a vibration pickup embodying the present invention;

FIG. 2 is a schematic flux diagram useful in explaining the operation of the pickup of FIG. 1;

FIG. 3 is a view similar to FIG. 1 showing the presently preferred embodiment of the invention;

FIG. 4 is a schematic flux diagram useful in explaining the operation of the pickup of FIG. 3; and FIG. 5 is a vertical sectional view of a modified weight or armature for use with the pickups of the present invention.

Referring now to FIG. 1 a bar type permanent magnet 10 is disposed in the axial bore 11 of a cylindrical coil form 12 made of non-magnetic material. For convenience, the material can also be an insulator. Because of its excellent insulating properties and its low coefficient of friction it is preferred at present to make the coil form out of polytetrafluoroethylene resin.

A pickup coil consisting of two windings 13 and 14 is symmetrically disposed about the center of the coil form, as shown. The ends of the windings are individually brought to the exterior of the device as shown at 15. An externally threaded sleeve 16 of electrically conductive non-magnetic material such as brass surrounds the pickup coil. A disc shaped permanent magnet 17 is disposed at the upper end of the coil form and held in place by the enclosure or end cap 18 which threadedly engages the sleeve 16. The end cap 18 may be made of aluminum or other non-magnetic conductive material.

At the lower end of the coil form two more disc type permanent magnets 19 and 20 along with a pair of non-magnetic spacers 21 and 22 are held in place by a lower end cap 23 also of aluminum. As shown, the end cap 23 is provided with a threaded mounting stud 24. End stops 25 and 26 of rubber or similar material are provided at opposite ends of the bore 11 of the coil form 12. As illustrated in the drawing, the connecting wires 15 are brought to the outside of the device through the opening 27 in the upper end cap 18. In the embodiment under discussion the individual windings 13 and 14 which make up the pickup coil are of equal axial length. It can be assumed that they also have the same number of turns of the same size wire. An unsymmetrical arrangement may be desired for certain special applications, but such a modification will be considered at a later point in this description.

If, by way of example, it is assumed that the magnets 10, 17, 19 and 20 are polarized as symbolically represented by the letters N and S appearing on the drawing, it should immediately be apparent that the permanent bar magnet 10 will float substantially as illustrated within the bore 11 of the coil form 12. This may be appreciated better by referring to FIG. 2 wherein the individual magnets are designated by the same reference numerals as used in FIG. 1, and the respective field paths are designated by the magnet number followed by the letter "a," e.g., 10a is the field for magnet 10.

If the vibration pickup is to be employed at all times in an upright position, as viewed in FIGS. 1 and 2, it is possible to substitute a non-magnetic disc for the magnet 17. However, if it is intended that the device should operate in other positions, the retention of the magnet 17 is necessary.

Bearing in mind that the permanent magnet 10 generates a magnetic field in whose path is disposed the windings 13 and 14 of the pickup coil (see FIG. 2), it will be appreciated that any movement of the magnet 10 relative to the windings 13 and 14 will generate a voltage therein. If the windings are connected in series additive relationship in known manner, the generated voltage can be caused to provide an indication of the relative movement between the magnet 10 and the remainder of the structure. It is well known that movement of a conductor in a direction perpendicular to a uniform magnet field will result in an induced voltage proportional to the velocity of such movement. Therefore, by suitable proportioning of the parts to develop a uniform magnetic field, i.e., to render the number of lines of magnetic flux cut by a given number of turns of the pickup coil uniform over the operating range of the device, the output voltage can be made proportional to the velocity of movement of an object coupled to the stud 24.

The necessary damping for this device is obtained by keeping to a minimum the clearance between the permanent magnet 10 and the bore 11 in the coil form 12 and by hermetically sealing the ends of the bore. A certain amount of eddy current damping will also be developed as a result of the relative movement of the magnet 10 with respect to the conductive sleeve 16 and the rest of the enclosure.

The embodiment described with reference to FIG. 1 has certain disadvantages, particularly one of size in view of the need for the disc magnets 17, 19 and 20 as well as the spacers 21 and 22. It might be added at this point that the aforementioned spacers are required to tailor the strength of the magnets 19 and 20 to the mass of the magnet 10. However, the mentioned disadvantage can be eliminated by resorting to the modification shown in FIG. 3.

The armature or weight in FIG. 3, as well as the coil form, pickup coil windings, and end stops, may take the same form as in FIG. 1 and, therefore, bear the same reference numerals. However, the disc magnets are now replaced by a single sleeve 28 of ferrous or other paramagnetic material. The flux diagram for this embodiment is shown in FIG. 4 with the same numbering scheme as used in FIG. 2.

Considering for the moment an omni-directional pickup, the sleeve 28 is centered longitudinally about the pickup coil. An upper end cap 29 of copper or other non-magnetic conductive material is brazed or otherwise joined to the sleeve 28 at the junction 30. A sleeve 31 also of copper or non-magnetic material is similarly joined at 32 to the lower end of the sleeve 28. The sleeve 31 has external threads along a portion of its length which are engaged by internal threads on the lower end cap 33. The end cap 33 may be made of aluminum or other non-magnetic conductive material. Formed integral with the end cap 33 is a mounting stud 34.

In the embodiment under discussion the magnetic field developed by the permanent magnet 10 serves to spring-couple the magnet 10 to the paramagnetic material of the sleeve 28. At the same time, the magnetic field developed by the magnet 10 encompasses the windings 13 and 14 of the pickup coil and functions to generate a voltage therein in response to relative movement therebetween.

Assuming upright orientation of the pickup as seen in FIG. 3, the magnet 10 due to its weight will assume a below center position representing a static deflection of the device. Because the device is completely symmetrical the same static deflection will be experienced if it should be inverted. By the same token, if the device is arranged in a horizontal position the magnet 10 will become centered within the bore 11. Air damping and eddy current damping is provided in the embodiment of FIG. 3 in the same manner as provided in FIG. 1.

As mentioned previously, the magnetic lines of force act as a spring suspending the weight or armature 10. Neglecting damping effects the natural frequency of oscillation of the floating member 10 can be computed from the following formula:

$$f = \frac{1}{2\pi}\sqrt{\frac{k}{m}} \quad (1)$$

wherein $f$ is the frequency in cycles per second, $k$ the spring constant in pounds per inch (i.e., pounds force required to move the magnet 10 a distance of one inch against the resistance of the "spring" force), and $m$ is the mass of the magnet in $$\frac{\text{lbs.-sec.}^2}{\text{in.}}$$

The value of $k$ in the above relationship is dependent upon the intensity of the magnetic field which, in turn, depends on the strength of the magnet and the permeance of the path through the air, the intervening material, and the magnetic sleeve 28. The amount of static deflection that can be tolerated will determine the mass of the magnet 10 with relation to the spring constant $k$. Both $k$ and $m$ in determining the resonant or natural frequency of the system will determine the lower frequency limit of useful operation. This is based upon the fact that at frequencies above the resonant frequency the weight will remain substantially stationary whereas at frequencies below the resonant frequency the weight will tend to move with the frame or body of the device. The various factors can be varied depending upon the use to which the device is intended to be put.

By way of example, and strictly for the sake of completeness, the following dimensions are set forth. These represent the dimensions employed in a device actually constructed and tested and found to produce satisfactory results.

Referring to FIG. 3, the magnet 10 had a diameter of 0.125 inch and a length of 0.5 inch. This magnet was disposed in a bore of 0.135 inch formed in the coil form 12. The coil form had a length of 1.1 inches while each of the windings 13 and 14 were spaced 0.1 inch from the adjacent ends of the coil form and 0.05 inch apart. The sleeve 28 was made of steel with an outside diameter of 0.590 inch and an inside diameter of 0.465 inch. The sleeve 28 fit snugly upon the coils. The material of the magnet 10 was Alnico V and each of the windings 13 and 14 consisted of 3,000 turns of No. 42 wire. With this arrangement the static deflection of the magnet 10 when the pickup was in an upright position was about 0.042 inch. The resonant frequency of the device was approximately 15 cycles per second.

In the embodiment of FIG. 3, the steel sleeve 28 is centered with respect to the windings 13 and 14. This is believed to be the optimum arrangement for an omni-directional pickup. In the horizontal position the magnet will be centered with respect to the sleeve. If the steel sleeve is offset from the central position relative to the windings the central magnet 10 will also be offset by the same amount. A pickup design intended exclusively for upright or vertical operation may have the sleeve offset upwardly in order to center the magnet 10 between the windings 13 and 14. This is for the purpose of obtaining maximum linearity of the device. If the device is intended to operate both upright and in a horizontal position the steel sleeve 28 may be raised approximately one-half the static deflection occurring in the upright position. For the specific example described above, the resultant offset of the magnet 10 with respect to the center of the coil form will be approximately 0.021 inch downwardly when the device is upright. When the device is placed horizontally the magnet 10 will be offset on the other side of the center of the coil form an equal amount. That is, the magnet would be off center with respect to the windings in one direction when vertical and in the other direction when horizontal.

For appropriate damping of the device the clearance between the magnet 10 and the non-magnetic sleeve or coil form should be held to a few thousandths of an inch. The entire unit should be sealed hermetically for this purpose as well as protecting the interior of the device from moisture, dirt and so forth.

Although the pickup coil is shown as two separate windings, it is contemplated that the coil may be produced as a continuous winding which reverses direction at the center of the coil form. Another possibility is to join or connect the windings in series internally in the proper phase relationship so as to bring only two rather than four wires to the outside.

The number of turns of wire as well as the wire size employed in the windings can be varied over a wide range depending upon the end use contemplated for the pickup. If the pickup is intended for shock measurements it is necessary to eliminate the damping of the magnet 10. This can be accomplished by providing the magnet with the longitudinal passage 35 as shown in detail in FIG. 5. At the same time, the magnet should be made relatively large and a small number of turns utilized for the pickup coil windings. The device could then be employed to drive directly a low impedance element.

At the other extreme, the device may be modified for the measurement of "jerk" (rate of change of acceleration). In this case, the device would be damped but used below its natural frequency, and a relatively high output sensitivity would be important. Therefore, as large a number of turns would be used as possible within established size and weight requirements to obtain maximum output voltage.

When considering the operation of the pickups described above in connection with FIGS. 1 and 3 it is helpful to think of the permanent magnet 10 as one element and the remaining structure including the windings 13 and 14 as a second element, the two elements being movable relative to each other. The permanent magnet 10 can be considered as a means for generating a magnetic field in whose path is disposed both the pickup coil and its associated magnetic material, the sleeve 28 in FIG. 3 or the magnets 17, 19 and 20 in FIG. 1.

In connection with the general embodiment of the invention illustrated in FIG. 3, the paramagnetic sleeve 28 can be replaced by a non-magnetic material if, at the same time, other paramagnetic means is incorporated in the structure to cooperate with the magnet 10. One possibility is to use a wire for the pickup coil windings 13 and 14 which consists of a conductive core clad in a paramagnetic sheath. A high temperature nickel clad copper wire has been found to produce an operable structure. This can result in weight saving by using a light material instead of steel for the sleeve 28.

Although it has not been mentioned previously, it is to be understood that the end stops 25 and 26 are positioned so as to prevent the magnet 10 from excessive movement in either direction or undesirable jarring against the end caps.

Having described the invention with reference to several embodiments thereof, it is to be understood that numerous changes may be made therein by those skilled in the art without departing from the true spirit of the invention as defined in the appended claims.

What is claimed is:

1. A vibration pickup comprising a cylindrical coil form with an axial bore, a pickup coil wound on said coil form, a sleeve of paramagnetic material surrounding said pickup coil and centered between the ends thereof, a bar magnet of lesser length than said coil form disposed in said bore so as to be spring-coupled magnetically to said sleeve with no structural connection therebetween for axial movement within said bore, means for establishing electrical connection to said pickup coil, and means for coupling said coil form to a vibrating object, said pickup coil being arranged to generate a signal voltage within given limits of frequency and displacement which is directly proportional to the velocity of movement of the object.

2. A vibration pickup according to claim 1, wherein said pickup coil comprises a pair of windings, one on each side of the center of said coil form, connected and arranged in series additive relationship.

3. A vibration pickup according to claim 2, wherein end caps of non-magnetic electrically conductive material are joined to said sleeve to provide both a housing for the pickup and eddy current damping of the relative movement of the magnet.

4. A vibration pickup comprising a cylindrical coil form with an axial bore, a pickup coil wound on said coil form, a sleeve of paramagnetic material surrounding said pickup coil and centered between the ends thereof, a bar magnet of identical cross-sectional shape but lesser length than said bore disposed therein with a loose slip fit so as to be spring-coupled magnetically to said sleeve with no structural connection therebetween for axial movement within said bore, means for hermetically sealing the ends of said bore to provide air damping of the movement of the magnet within the bore, means for establising electrical connection to said pickup coil, and means for coupling said coil form to a vibrating object, said pickup coil being arranged to generate a signal voltage within given limits of frequency and displacement which is directly proportional to the velocity of movement of the object.

5. A vibration pickup according to claim 4, wherein end caps of non-magnetic electrically conductive material are joined to said sleeve to provide both a housing for the pickup and eddy current damping of the relative movement of the magnet.

6. A vibration pickup according to claim 5, wherein said pickup comprises a pair of windings, one on each side of the center of said coil form, connected and arranged in series additive relationship, and having a total axial length which is greater than the length of said magnet.

7. A vibration pickup according to claim 4, wherein the bar magnet is provided with a longitudinal passage therethrough for eliminating the air damping thereof, and the hermetically sealing means is retained as environmental protection.

8. A vibration pickup comprising a cylindrical coil form with an axial bore, a pickup coil wound on said coil form, a sleeve of paramagnetic material surrounding said pickup coil intermediate the ends thereof, a bar magnet of lesser length than said coil form disposed in said bore so as to be spring coupled magnetically to said sleeve with no structural connection therebetween for axial movement within said bore, said sleeve being offset from the center of said coil an amount equal to the static deflection of said magnet for a given orientation of the pickup for centering the magnet with respect to the coil when the pickup is so oriented, means for establishing electrical connection to said pickup coil, and means for coupling said coil form to a vibrating object, said pickup coil being arranged to genereate a signal voltage within given limits of frequency and displacement which is directly proportional to the velocity of movement of the object.

9. A vibration pickup comprising a cylindrical coil form with an axial bore, a pickup coil wound on said coil form, a sleeve of ferrous material surrounding said pickup coil within the axial limits of the ends thereof, means for generating a magnetic field, said means being shorter than said coil form and disposed in said bore so as to be spring-coupled magnetically to said sleeve with no structural connection therebetween for axial movement within said bore, means for establishing electrical connection to said pickup coil, and means for coupling said coil form to a vibrating object, said pickup coil being arranged to generate a signal voltage within given limits of frequency and displacement which is directly proportional to the velocity of movement of the object.

10. A vibration pickup comprising a cylindrical coil form with an axial bore, a pickup coil wound on said coil form, said pickup coil being embraced by a first ferrous body in cylindrical form, a second ferrous body shorter than said coil form and disposed in said bore for axial movement therein, at least one of said ferrous bodies comprising a magnet for generating a magnetic field which embraces the other ferrous body spring-coupling the two bodies in spaced relationship, there being no structural connection therebetween, means for establishing electrical connection to said pickup coil, and means for coupling said coil form to a vibrating object.

References Cited in the file of this patent

UNITED STATES PATENTS

| | | |
|---|---|---|
| 2,311,079 | Parr | Feb. 16, 1943 |
| 2,591,921 | Cosgriff | Apr. 8, 1952 |
| 2,651,769 | Stafford | Sept. 8, 1953 |
| 2,852,243 | Shepard | Sept. 16, 1958 |
| 2,913,701 | Wackholz | Nov. 17, 1959 |
| 2,919,583 | Parker | Jan. 5, 1960 |
| 2,942,479 | Hollman | June 28, 1960 |